C. A. GREEN.
Thill-Couplings.
No. 156,996.  Patented Nov. 17, 1874.
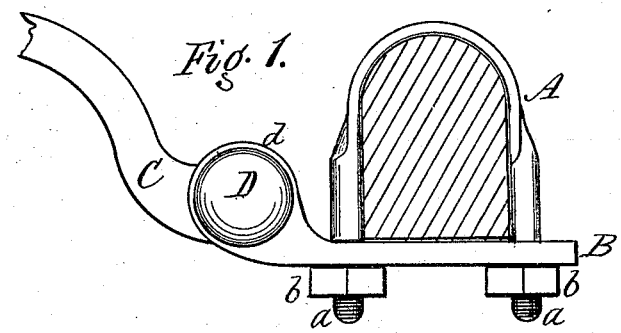
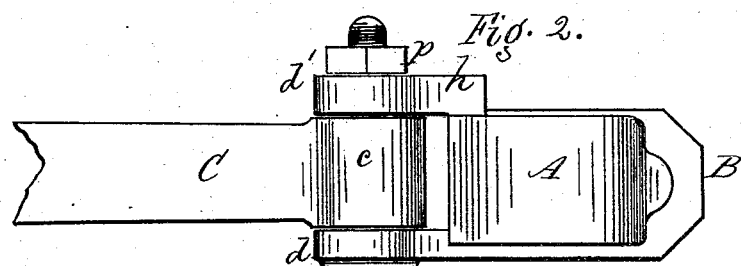
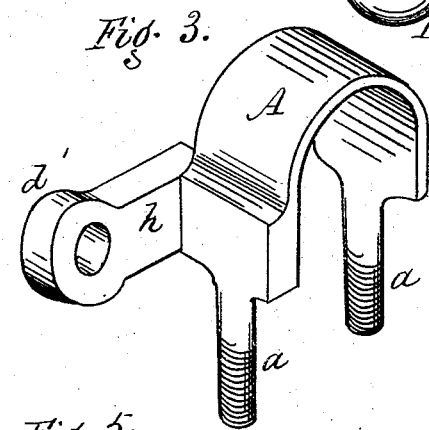
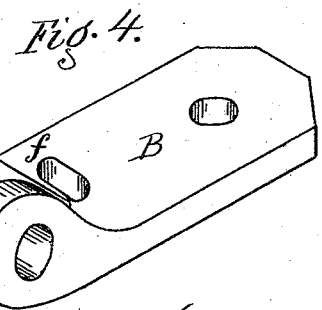
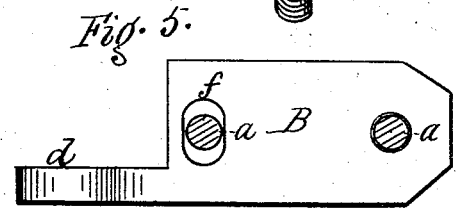
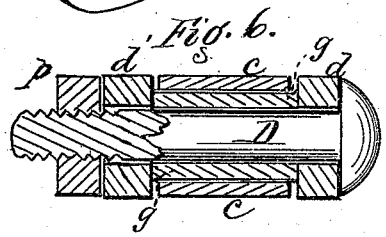
Witnesses.  Charles A Green Inventor.
John E. Douglas
M. H. Green

UNITED STATES PATENT OFFICE.

CHARLES A. GREEN, OF ROCHESTER, NEW YORK.

IMPROVEMENT IN THILL-COUPLINGS.

Specification forming part of Letters Patent No. 156,996, dated November 17, 1874; application filed February 28, 1874.

*To all whom it may concern:*

Be it known that I, CHARLES A. GREEN, of the city of Rochester, Monroe county, New York, have invented a simple, inexpensive, strong, durable, safe, and adjustable Thill and Pole Coupling; and I do hereby declare that the following is a full, clear, and exact description thereof, reference being had to the accompanying drawings forming a part of this specification.

The object of this invention is to prevent the rattling of thill or pole couplings, and to lessen the wear thereof; and to this end it consists of an adjustable coupling, and of a peculiar manner of packing the coupling.

In the accompanying drawings, Figure 1 is a side view of my coupling. Fig. 2 is a view from above the same. Fig. 3 is a section thereof, showing axle-clip and eye attached. Fig. 4 is the clip-tie with eye to coupling attached, and showing slot $f$. Fig. 5 is another view of clip-tie and eye to coupling attached. Fig. 6 is a view of the eyes of the coupling, packing, nut of coupling-bolt, and part of bolt exposed, as though divided in center previous to the eyes of the coupling being compressed to swell the packing.

Similar letters of reference indicate corresponding parts in all the figures of this improved coupling.

A is the axle-clip. B is the clip-tie with coupling-eye attached. C is the thill or pole. D is the coupling-bolt. $a'$ $a$ are the ends of clip, on which the clip-nuts $b$ $b$ are turned to hold the clip-tie B, with coupling-eye $d$ attached. $c$ is the thill-eye, the eye in which is enlarged, as shown in Fig. 6, to admit the packing. $d$ is the coupling-eye attached to the clip-tie B, which, shifting in slot $f$ at will by tightening-nut $p$, swells the packing $g$, which is somewhat longer than thill-eye $c$, thereby causing the packing $g$ to press firmly all with which it comes in contact, as would be shown in Fig. 6, had the coupling-eyes $d$ and $d'$ been represented therein, as compressed to the thill-eye $c$ by the nut $p$. The packing $g$ is composed of compressible material in tubular form or otherwise.

In order to attach the different parts of this coupling in their proper positions the tubular or other packing $g$ is placed in thill-eye $c$, projecting somewhat beyond thill-eye $c$, as shown in Fig. 6. The thill-eye $d$ being left open to the fullest extent from the coupling-eye $d'$ the thill-eye, with packing therein, is easily introduced between eyes $d$ and $d'$, and the bolt D passing through eyes $d$ and $d'$ and loosely through packing $g$, the nut $p$, on being tightened, draws the eyes $d$ and $d'$ together, and thereby compressing the packing $g$ firmly into the eye $c$ against the part of bolt D in eye $c$, and also against parts of eyes $d$ and $d'$.

Should the shoulders of eyes $d$, $d'$, and $c$ become worn somewhat in time, by tightening nut $p$ they may be made as closely fitting as before.

The invention above described may be modified or applied in various ways, one of which is by having two axle-clips with one coupling-eye attached to each. The thill-eye introduced between them and bolted and packed, as before described, produces substantially the same effect as this invention, and I desire to protect myself from others manufacturing this modification of my invention.

I am aware of patent No. 22,604 to Geo. Kenney, dated January 11, 1859, and do not therefore claim anything therein shown or described; but What I do claim is—

1. The combination of the axle-clip A with the clip-tie B, having slot $f$, as and for purpose described.

2. The clip-tie B, having slot $f$ and eye $d$, and the axle-clip A, having eye $d'$ and threaded ends $a$, in combination with the thill-eye $c$, rubber packing $g$, bolt D, and nut $b$, substantially as for the purpose specified.

CHARLES A. GREEN.

Witnesses:
M. H. GREEN,
FRED. K. KLEINS.